US011968240B2

(12) United States Patent
Venkateswaran et al.

(10) Patent No.: US 11,968,240 B2
(45) Date of Patent: Apr. 23, 2024

(54) NETWORK POSTURE BASED SUGGESTION OF APPLICATIONS AND SERVICES

(71) Applicant: Cisco Technology, Inc., San Jose, CA (US)

(72) Inventors: Rajesh Tarakkad Venkateswaran, Bangalore (IN); Ganesan Rajam, Bengaluru (IN); Umang Tandon, Bangalore (IN); Raghavendra Keshava Neelekani, Bengaluru (IN)

(73) Assignee: CISCO TECHNOLOGY, INC., San Jose, CA (US)

(*) Notice: Subject to any disclaimer, the term of this patent is extended or adjusted under 35 U.S.C. 154(b) by 932 days.

(21) Appl. No.: 16/291,505

(22) Filed: Mar. 4, 2019

(65) Prior Publication Data
US 2020/0287941 A1    Sep. 10, 2020

(51) Int. Cl.
*H04L 9/40* (2022.01)
*G06F 8/61* (2018.01)
*H04L 45/64* (2022.01)

(52) U.S. Cl.
CPC .............. *H04L 63/205* (2013.01); *G06F 8/61* (2013.01); *H04L 45/64* (2013.01)

(58) Field of Classification Search
CPC . H04L 63/1425; H04L 63/1416; H04L 63/20; H04L 63/10; H04L 63/1408; H04L 63/14; H04L 67/10; H04L 67/22; H04L 67/12; H04L 67/322; H04L 67/34; H04L 43/08; H04L 43/16; H04L 43/00; H04L 43/062; H04L 43/10; H04L 43/12; H04L 41/5051; H04L 41/0893; H04L 41/12; H04L 41/0886; H04L 41/14; H04L 41/147; H04L 41/20; H04L 41/5096; H04L 41/0631; H04L 41/0681; H04L 41/0803; H04L 41/0813; H04L 41/0816; H04L 41/5054; H04L 47/10; H04L 47/12; H04L 47/125; H04L 47/2475
See application file for complete search history.

(56) References Cited

U.S. PATENT DOCUMENTS

| | | | |
|---|---|---|---|
| 8,909,926 B2* | 12/2014 | Brandt | G06N 20/00 713/166 |
| 9,516,053 B1* | 12/2016 | Muddu | H04L 63/1416 |
| 9,912,494 B2 | 3/2018 | Nethi et al. | |
| 10,070,344 B1* | 9/2018 | Dowlatkhah | H04W 28/0289 |
| 10,514,978 B1* | 12/2019 | Lee | G06F 11/0772 |

(Continued)

OTHER PUBLICATIONS

Verax Systems, A Sonalake Company, "Verax NMS & APM", https://veraxsystems.com/network-management-and-application-monitoring/, downloaded Mar. 4, 2019, 1 page.

(Continued)

*Primary Examiner* — Tae K Kim
(74) *Attorney, Agent, or Firm* — Edell, Shapiro & Finnan, LLC (57) ABSTRACT

In an embodiment, a method comprises detecting, by a network control entity associated with a software-defined network, a network event in the software-defined network. The network control entity determines, based on the network event, an application for installation at the network control entity or in the software-defined network. The application is automatically installed at the network control entity or in the software-defined network.

20 Claims, 6 Drawing Sheets

(56) References Cited

U.S. PATENT DOCUMENTS

| | | | | |
|---|---|---|---|---|
| 2015/0142961 A1* | 5/2015 | Ogawa | H04L 41/0816 | |
| | | | 709/224 | |
| 2016/0087956 A1* | 3/2016 | Maheshwari | H04L 63/205 | |
| | | | 726/6 | |
| 2016/0323143 A1* | 11/2016 | Kim | G06F 3/0629 | |
| 2016/0330067 A1* | 11/2016 | Liu | H04L 41/046 | |
| 2016/0359872 A1* | 12/2016 | Yadav | H04L 63/1425 | |
| 2016/0359891 A1* | 12/2016 | Pang | H04L 43/0805 | |
| 2016/0366014 A1* | 12/2016 | Koo | G06F 9/45558 | |
| 2017/0048079 A1* | 2/2017 | Nethi | H04L 12/2836 | |
| 2017/0104609 A1* | 4/2017 | McNamee | H04L 63/06 | |
| 2017/0257432 A1* | 9/2017 | Fu | H04L 67/2823 | |
| 2017/0353494 A1* | 12/2017 | Krinos | H04L 63/10 | |
| 2018/0026832 A1* | 1/2018 | Yu | H04L 41/0672 | |
| | | | 370/216 | |
| 2018/0124158 A1* | 5/2018 | Amento | H04L 67/34 | |
| 2018/0191838 A1* | 7/2018 | Friedman | H04L 12/1403 | |
| 2018/0262467 A1* | 9/2018 | Jayawardena | H04L 63/0254 | |
| 2018/0302277 A1* | 10/2018 | Shimamura | H04L 41/145 | |
| 2018/0316608 A1* | 11/2018 | Dowlatkhah | H04L 41/509 | |
| 2018/0332441 A1* | 11/2018 | Shaw | H04L 67/1044 | |
| 2018/0351652 A1* | 12/2018 | Ashrafi | H04L 41/08 | |
| 2019/0037446 A1* | 1/2019 | Dowlatkhah | H04W 28/0289 | |
| 2019/0045012 A1* | 2/2019 | Takajo | H04L 67/12 | |
| 2019/0068622 A1* | 2/2019 | Lin | H04L 63/1441 | |
| 2019/0068627 A1* | 2/2019 | Thampy | H04L 63/1425 | |
| 2019/0097873 A1* | 3/2019 | Nucci | H04L 41/147 | |
| 2019/0158361 A1* | 5/2019 | Blasi | H04L 41/22 | |
| 2019/0245757 A1* | 8/2019 | Meyer | G06F 9/5072 | |
| 2020/0177629 A1* | 6/2020 | Hooda | H04L 47/125 | |
| 2020/0213199 A1* | 7/2020 | Sethi | H04L 41/0889 | |
| 2020/0310846 A1* | 10/2020 | Moradi | H04L 43/10 | |
| 2020/0374181 A1* | 11/2020 | Stenberg | H04W 24/00 | |
| 2021/0211880 A1* | 7/2021 | Khawer | H04W 60/06 | |
| 2022/0303196 A1* | 9/2022 | Giust | H04L 67/562 | |

OTHER PUBLICATIONS

Gyana Dash et al., "Quasi-Optimal Software Recommendation Analytics System (OPERA) for Network Devices", Technical Disclosure Commons, Defensive Publications Series, Jun. 21, 2018, 19 pages.

Rajesh Tarakkad Venkateswaran, "DNA-C Suggest", ITONICS—Cisco Innovation Hub, Mar. 22, 2018, 2 pages.

Cisco, "The Cisco Digital Network Architecture Vision—An Overview", Whitepaper, May 5, 2017, 26 pages.

* cited by examiner

FIG.1

| | DESIGN | POLICY | PROVISION | ASSURANCE | | |
|---|---|---|---|---|---|---|
| Devices  Fabric | | | | | | |
| Home > All Suggestions | | | | | | |
| Installation Actions | | | | | | |
| ▽ Filter  ⟳ Resync | | | | | Q Find | |
| ☐ IP Address | | Message —212 | | Time —214 | Action —216 | |
| 202— ☐ 10.232.36.41 | | PoE: NuLED light mac: b043.5d00.01a9 is connected on interface GI4 | | Just Now | NuLED light connected to this device. Controller installed. | |
| 204— ☐ 10.232.36.41 | | GPS service is READY with 6 satellites | | Just Now | Your device picked up multiple satellites. Geo fencing app installed. | |
| 206— ☐ 10.78.106.192 | | HTTPS traffic has been exceeded to 62% | | Just Now | ETA app installed to protect against encrypted mischievous traffic. | |
| | | | | Showing 3 of 3 | ⓘ Information Event occurred GPS service is READY with 6 satellites on device 10.232.36.41 | |

FIG.2A

Suggestions

DESIGN  POLICY  PROVISION  ASSURANCE

Devices  Fabric

Home > All Suggestions

▽ Filter | ↻ Resync                                                              ⌕ Find

| | IP Address | Message | Time | Action 266 |
|---|---|---|---|---|
| 252 ☐ | 10.232.36.41 | PoE: NuLED light mac: b043.5d00.01a9 is connected on interface GI4 | Just Now | We just detected a nuLED light connected to this device. Do you want to install the controller? |
| 254 ☐ | 10.232.36.41 | GPS service is READY with 6 satellites | Just Now | Your device has picked up multiple satellites. How about some Geo fencing? |
| 256 ☐ | 10.78.106.192 | HTTPS traffic has been exceeded to 62% | Just Now | Install the ETA app to protect against encrypted mischievous traffic. |

Showing 3 of 3

ⓘ Information

Event occurred GPS service is READY with 6 satellites on device 10.232.36.41

Feedback ?

NETWORK POSTURE BASED SUGGESTION OF APPLICATIONS AND SERVICES

TECHNICAL FIELD

The present disclosure relates to managing networks.

BACKGROUND

Increasingly customers are moving towards platforms which allow them to manage their network management applications, assurance applications and business applications in a single window. Fog/edge applications can be managed so that business logic can be run as an application in the network device itself. In such an environment, it is possible for administrators to not be aware of different available applications and their relevance to the network. Therefore, some applications that could possibly help customers may not be used.

DESCRIPTION OF EXAMPLE EMBODIMENTS

Overview

Presented herein is a system and method that involve sensing network data, aggregating it and analyzing it to suggest the most relevant and useful add-on application extension to a network management application. In an embodiment, a method comprises detecting, by a network control entity associated with a software-defined network, a network event in the software-defined network. The network control entity determines, based on the network event, an application for installation at the network control entity or in the software-defined network. The application is automatically installed at the network control entity or in the software-defined network.

Example Embodiments

Currently, there is no mechanism available to determine application relevance based on network and application platform events. Such information could be used to make suggestions to an administrator or used to close a feedback loop on automated Software-Defined Networking (SDN) controllers. Accordingly, a solution is presented herein by which administrators can easily manage the network using best possible applications customized for network needs.

An end-to-end solution is provided that integrates application relevance to different network and platform events. An application is intended for a specific purpose. For example, an application designed to analyze encrypted network traffic is relevant in those segments of the network observing a higher percentage of encrypted traffic. Similarly, an Internet-of-Things (IoT) controller application, such as a light controller, is relevant only when there are controllable lights connected to Power over Ethernet (PoE) switches in a network. This suggestion platform functionality provides insight into must-have applications for better network operations. It is also beneficial in the case of necessary applications, like an IoT controller, where the suggestion platform identifies the proper controller application for the model and make of an IoT device.

Figure 1:
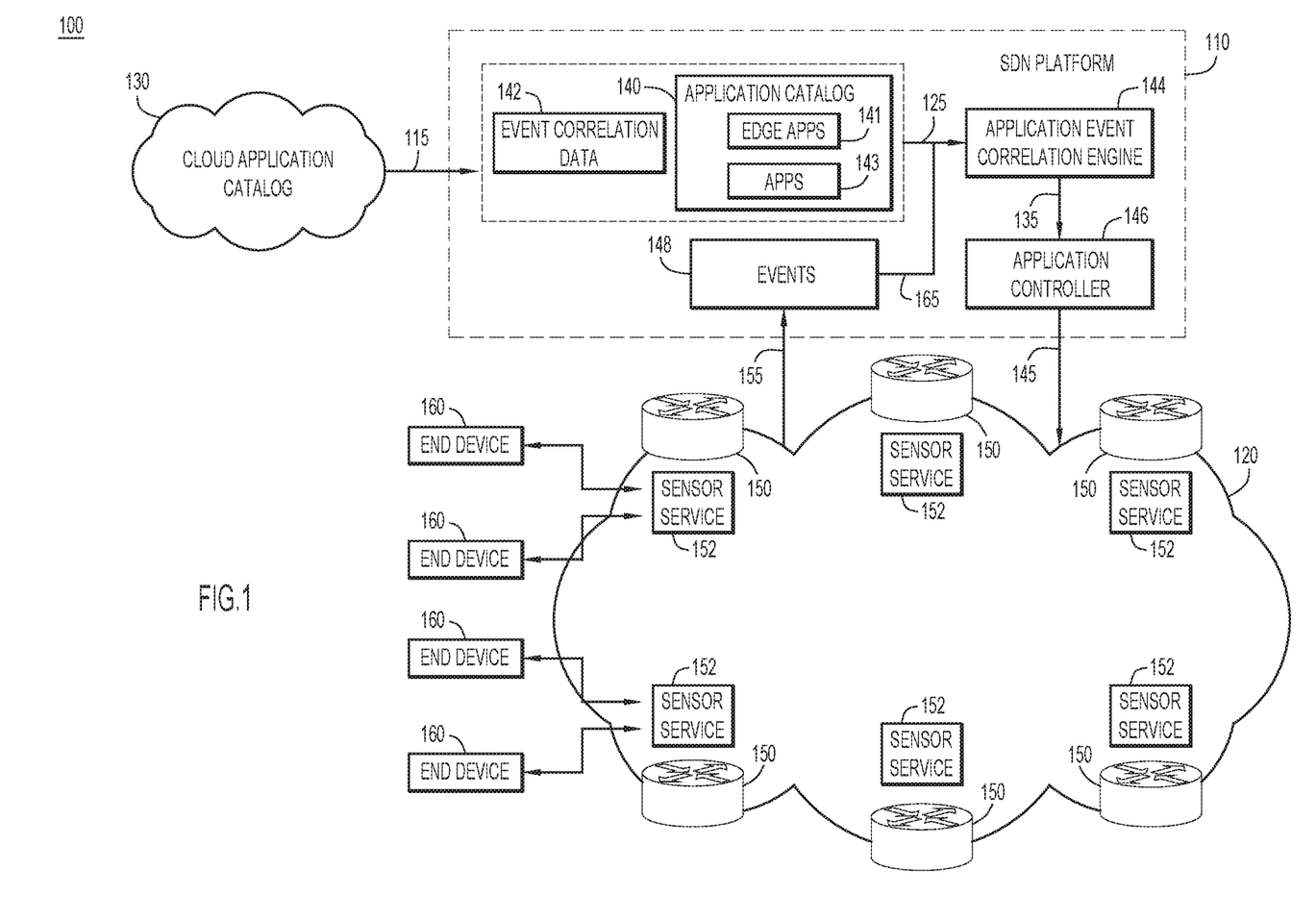
FIG. 1 is a diagram depicting a network environment in which network posture based suggestions of applications and services are deployed, according to an example embodiment.

Reference is now made to FIG. 1. FIG. 1 is a diagram depicting a network environment 100 in which network posture based suggestions of applications and services are deployed, according to an example embodiment. The network environment 100 includes an SDN platform 110, a network 120, and a cloud application catalog 130.

The SDN platform 110 includes a control system that includes an application catalog 140, event correlation data 142, an application event correlation/suggestion engine 144, an application controller/network programming service 146, and a network event collector service 148. The SDN platform 110 provides capabilities to install and manage services/applications, and for the services to communicate with each other. The application catalog 140 contains the application and service packages. The application controller/network programming service 146 interacts with network devices 150 in the network 120 to configure collection of data. The network event collector service 148 interacts with network devices 150 to collect generated network event data. The application event correlation/suggestion engine 144 is a data processing service that analyzes generated data to generate controls directed by the application controller 146. The application controller 146 can direct the network devices 150 or appliances of the SDN platform 110, for example, to install, un-install, and/or upgrade an application.

As mentioned, the network 120 includes a plurality of network devices 150. The network devices may be any suitable device configured to process data and communicate via one or more networks, such as routers, switches, access points (APs), wireless access controllers, etc., and they may take the form of physical or virtual devices. The network devices 150 are configured to run a sensor service 152. The sensor service 152 is a software component expected to run in a network device as an edge application. The sensor service 152 allows for reduction in the amount of data to be polled for generating events from a centralized collector resulting in lessor load on the network 120. Endpoints 160 are physical or virtual devices that connect to the network 120 via the network devices 150. The endpoints 160 are consumers of network services defined at the application layer and may take the form of personal computers, servers, smart phones, IP-phones, IP-enabled point-of-sale (POS) devices, smart-home devices, IP-enabled vehicles, etc.

Applications that are available for downloading and installation at the SDN platform 110 or the network devices 150 are provided via an application catalog. In some implementations, some or all of the applications that are available are provided via the cloud application catalog 130 and/or the application catalog 140. Shown at reference numeral 115, an application is provided to the SDN platform 110 from the cloud application catalog 130. For ease of explanation, the following is described with respect to the application catalog 140, but it is to be understood that the description equally applies to the cloud application catalog 130, unless context indicates otherwise. The application catalog 140 represents "App Store" or other network service that provides a collection of applications that may be downloaded and subsequently installed at various network devices 150 in the network and/or at the SDN platform 110. The applications may be retrieved from the application catalog 140 automatically or with interaction from a user/administrator. As shown in FIG. 1, in the application catalog 140, there are two types of applications available: edge applications 141 (e.g., fog applications) and network management applications 143 (shown as "APPS"). The edge applications 141 are applications that are to be installed at and run on network devices 150 that are at the edge of the network 120. The network management applications 143 are applications that are to be installed at and run on the SDN platform 110.

When an application becomes available in the application catalog 140, a determination is made as to what conditions need to be met for an event to be deemed to have occurred in order trigger use/installation of that application. These conditions are provided by the application itself or from another source. Each available application in the application catalog 140 is mapped to a corresponding set of event correlation data 142. The event correlation data 142 represents the network/device conditions for which the application is considered relevant. The event correlation data 142 is a model component provided to capture the definition of network events for which an application is deemed relevant. This information is defined as an application network event mapping. In other words, the event correlation data defines the set of conditions that are to exist with respect to the network 120 and/or network devices 150 in the network 120 in order to determine the occurrence of a network event, which is an indication that the application is relevant to the current state/posture of the network 120 and/or network devices 150 attached (connected) to the network. For example, an application A may be available in the cloud application catalog 130 and may be mapped to a set X of event condition data. The set X of event condition data includes conditions x1, x2, and x3 conditions. If these conditions were to occur, then application A would be considered relevant, and a suggestion could be made to an administrator to install application A since it has been determined to be relevant, or application A could be automatically installed as a result of being determined to be relevant.

The network events can be classified as predefined known events and custom events. A predefined event is an event that the SDN platform 110 is capable of producing by default. The list of predefined events can be made available through an Application Programming Interface (API) and product documentation. A custom event is an event defined in the application manifest itself. The data model allows the specification of what data to collect and what processing to be done to generate a custom event. In addition to event specifications, the application event correlation engine 144 can also be configured to correlate across events or aggregate events. The application network event mapping configuration/event correlation data 142 can be embedded within application packaging as a manifest file. Alternately/additionally, the application network event mapping configuration/event correlation data can be programmed through an API.

The application event correlation/suggestion engine 144 runs as a platform default service. When an application becomes available in the application catalog 140, at 125, the application event correlation engine 144 gathers information regarding the network events to be listened/monitored for to determine application relevancy. For example, upon availability of an application in the application catalog, the application event correlation engine 144 reads the application manifest, if available, to gather information regarding the network events to listen for. If an application manifest is not included or if the application manifest does not include such information, or more generally, if application network event mapping is not embedded within the application, then the information may be obtained via an API.

In case of predefined events, the application event correlation engine 144 programs the network event collector service 148 to listen for the predefined event. In case of custom events defined in the manifest, the application event correlation engine 144 interacts with the above mentioned services, including the application controller 146, to program the network 120 to generate the desired network event. The application event correlation engine 144 programs the network event collector service 148 to listen for the custom event. At 135, the application event correlation engine 144 interacts with the application controller 146, which, at 145, programs the network 120 to generate the desired network event. At 155, the network event collector service 148 detects an event. At 165, the application event correlation engine 144 receives the event from the network event collector service 148.

Upon receiving the event, the application event correlation engine 144 applies any correlation logic, if specified. Upon a successful mapping condition, the application event correlation engine 144 retrieves the application information and generates an application action suggestion for the administrator, or for a configuration to be made via the application controller 146. The suggestion may be presented to administrator to review and take action as appropriate. The service may provide an automated workflow based on administrator's intent to act on application action suggestion.

In some implementations, when an application becomes available in the application catalog 140, a decision may be made as to whether this application is a type/kind of application for which events are to be monitored. For example, there may be some criteria in which applications, although available in the application catalog 140, are not to be monitored for relevancy (either in certain domains, or specific to certain nodes within a domain, or any other suitable exclusion criteria), regardless of the state/posture of the network 120. For example, an application may be installed automatically or by administrator action at a particular subset of the network devices 150 without monitoring the network 120 for the occurrence of corresponding event conditions. As another example, a determination may be made to not monitor the network 120 for the occurrence of the event correlation data 142 corresponding to a particular application. In other words, certain types/kinds of applications may be categorically excluded from consideration and thus, in such a scenario, data is not to be collected/analyzed for the purpose of determining whether to download/install those particular applications.

Not all applications can be installed on all systems since the suggestions made need to determine the relevance of the applications on the device in question while also honoring all device resource constraints. In other words, the decision of whether to install an application, either at one or more of the network devices 150 in the network 120 or at the SDN platform 110, may be based on both the collected data that indicates the occurrence of a network event mapped to the application as well as the device constraints corresponding to the devices on which the application may be installed.

An application may be determined to be relevant and therefore may be suggested to an administrator for installation or may be automatically installed. For example, an application may be suggested/installed: (i) based on connected sensors, such as a light controller connected to a network switch; (ii) based on connected resources, such as a compute card added to a network switch; (iii) to upgrade an existing application, such as a new version of an IoT light controller is now available; (iv) based on observed network events, such as (a) Denial of Service (DoS) attacks in one part of the network, (b) the occurrence of a generic network event, such as packet matches a drop Access Control List (ACL) rule, and/or (c) rate of occurrence of a network event, such as frequent packets from a given source; (v) based on the role played by the device on the network (e.g., perfSonar™ is an open source network test tool that typically runs on a site edge router); (vi) based on license availability, such as use the application on the node that needs it the most at this point in time (i.e., how to optimally use a license); and/or (vii) based on current device configuration.

A non-exhaustive list of example device constraints includes: (i) central processor unit (CPU) availability; (ii) memory availability; (iii) disk availability; (iv) runtime environment (e.g., an x86 compiled application cannot run on a PPC environment; and/or (v) end user intent (has the administrator consented to this device running edge applications).

An application relevance score may be determined based on the application relevance considerations listed above. A device score may be determined based on the resource availability and placement of the device in the network. A combination of these scores is used to make a final decision on the best possible location to run the application. It is to be understood that the lists of application relevance conditions and device constraints are only exemplary and are not exhaustive. As such, application relevance scores may be determined based on other considerations and some or all of the listed application relevance conditions may not be used to determine the application relevance scores. Likewise, device scores may be determined based on other device constraints and some or all of the listed device constraints may not be used to determine the device scores.

For instance, if an application is more relevant when running on the edge of a network, based on the application relevance score, all the edge devices would be identified. Subsequently, based on the device score, the best possible edge device would be identified. If the identified device does not have sufficient resources, the next best placement will be suggested.

In some implementations, one or more of network devices 150 issue an event, which is consumed by the correlation engine 144. The application event correlation engine 144 then determines an appropriate application to be installed. If the application is not found in the SDN platform 110, then the application is retrieved from the cloud application catalog 130 and installed at the SDN platform 110. Cloud application catalog 130 may be accessible to the SDN platform 110 via any public, semi-public, or private networks, including enterprise networks, the Internet, community networks, etc.

The following is a non-exhaustive list of example network events. The network events may be based on the type of network device, particular protocols employed by the network devices, and/or any other suitable consideration. For example, an endpoint 160 or a Bring Your Own Device (BYOD) may make a Dynamic Host Configuration Protocol (DHCP) request for an address (e.g., an IP address). The network devices 150 in path will monitor the DHCP activity to determine successful address grant. In case of multiple failures, one or more of the network devices 150 inform the SDN platform 110 through an event to instantiate a DHCP server with the required properties. Based on the event, the SDN platform 110 (through the application controller 146) instantiates a DHCP server on-demand.

As another example, an endpoint 160 may make a RADIUS/authentication, authorization, and accounting (AAA) request. An AAA server application may not be installed at the SDN platform 110/application controller 146, and based on the request, the AAA server application is installed.

As another example, an endpoint 160 may make a plug & play (PnP) request. A PnP application may not be installed at the SDN platform 110/application controller 146, and based on the request, the PnP application is installed.

As another example, deployment of a Wide Area Bonjour™ Application in the application controller 146 may be based on Bonjour advertisements and requests from network devices 150 (e.g., service discovery gateway agents). Bonjour is a version of the Zero Configuration Networking (Zeroconf) standard, a set of protocols that allows certain communication between network-connected devices, applications and services. Subsequent notifications may be provided to the administrator to deploy required policies on the Wide Area Bonjour Application.

As another example, an unusual rate (e.g., above a threshold) of packets for a particular protocol (e.g., telnet, secure shell (ssh), etc.) is detected by multiple network devices 150. Based on this event, the application controller 146 will instantiate applications which can honey-pot a potential attacker.

Figure 2A:
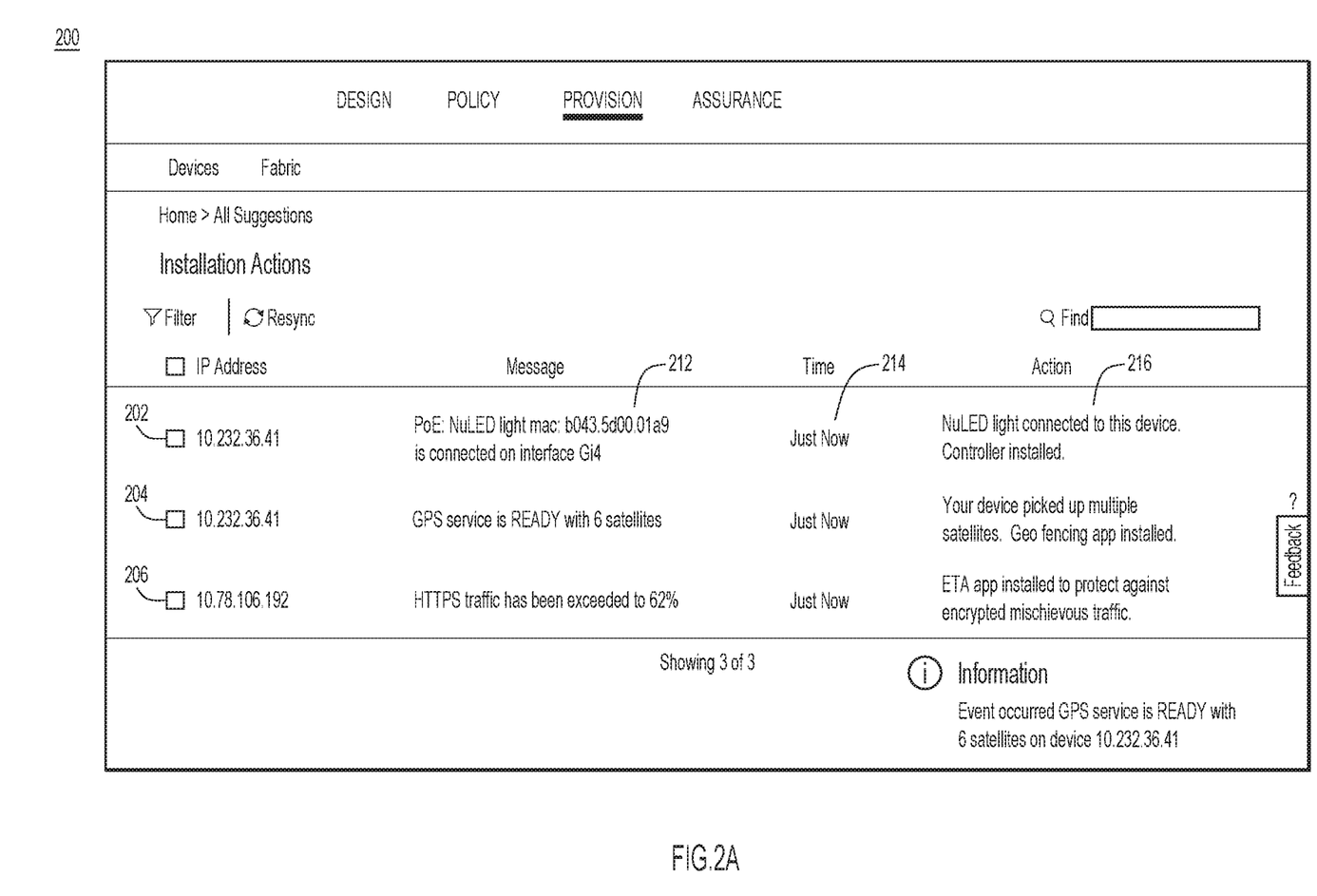
FIGS. 2A and 2B are screenshots of example graphical user interfaces showing application installation action records, according to an example embodiment.

Referring next to FIG. 2A, shown is an example screenshot 200 of a graphical user interface (GUI) showing installation actions, according to an example embodiment. The screenshot 200 shows three installation action records 202, 204, 206 that were the result of implementing the techniques described herein. Each of the installation action records includes an IP address, a message, a time, and an action. For example, the installation action record 202 includes IP address 210, message 212, time 214, and action 216. The message 212 may indicate to the administrator that an endpoint, such as a NuLED light, has been connected to the network via a connection to an interface of a network device. The IP address 210 indicates the IP address of/assigned to the NuLED light. The time 214 may indicate the time at which this connection occurred or a time that the action 216 was implemented. The time 214 may indicate other times as well. The action 216 indicates that the controller application for the NuLED light was automatically installed.

Figure 2B:
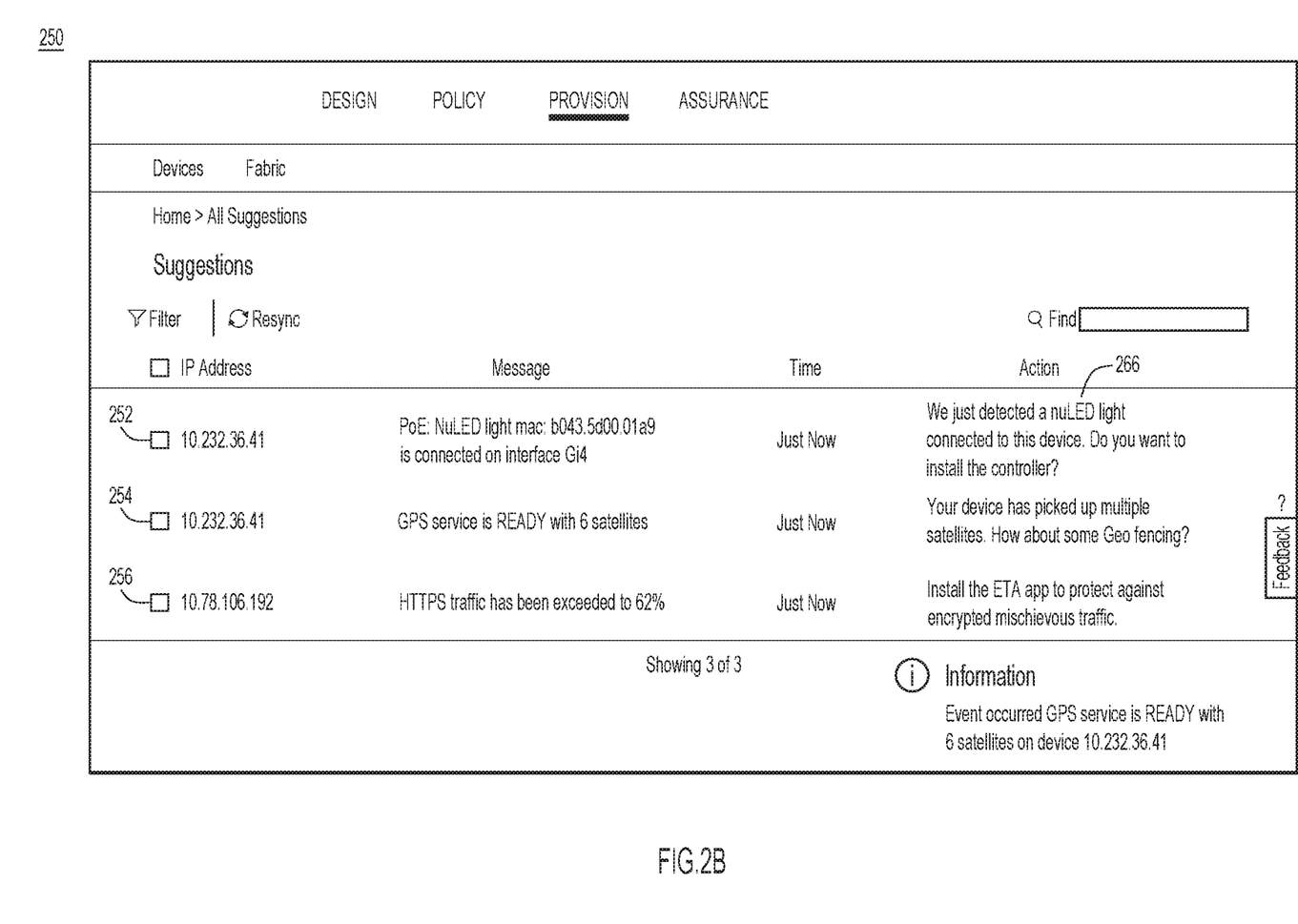

Referring next to FIG. 2B, shown is an example screenshot 250 of a GUI showing suggestions, according to an example embodiment. The screenshot 250 shows three suggestion records 252, 254, and 256 that were the result of implementing the techniques described herein. The screenshot 250 is the same as the screenshot 200 shown in FIG. 2A, except for the action. In the screenshot 250, the action represents a suggestion or recommendation for an administrator to review and take action as appropriate. For example, instead of the controller being automatically installed as was the case in the scenario in FIG. 2A and indicated in action 216, the action 266 suggests that the controller application be installed.

Figure 3:
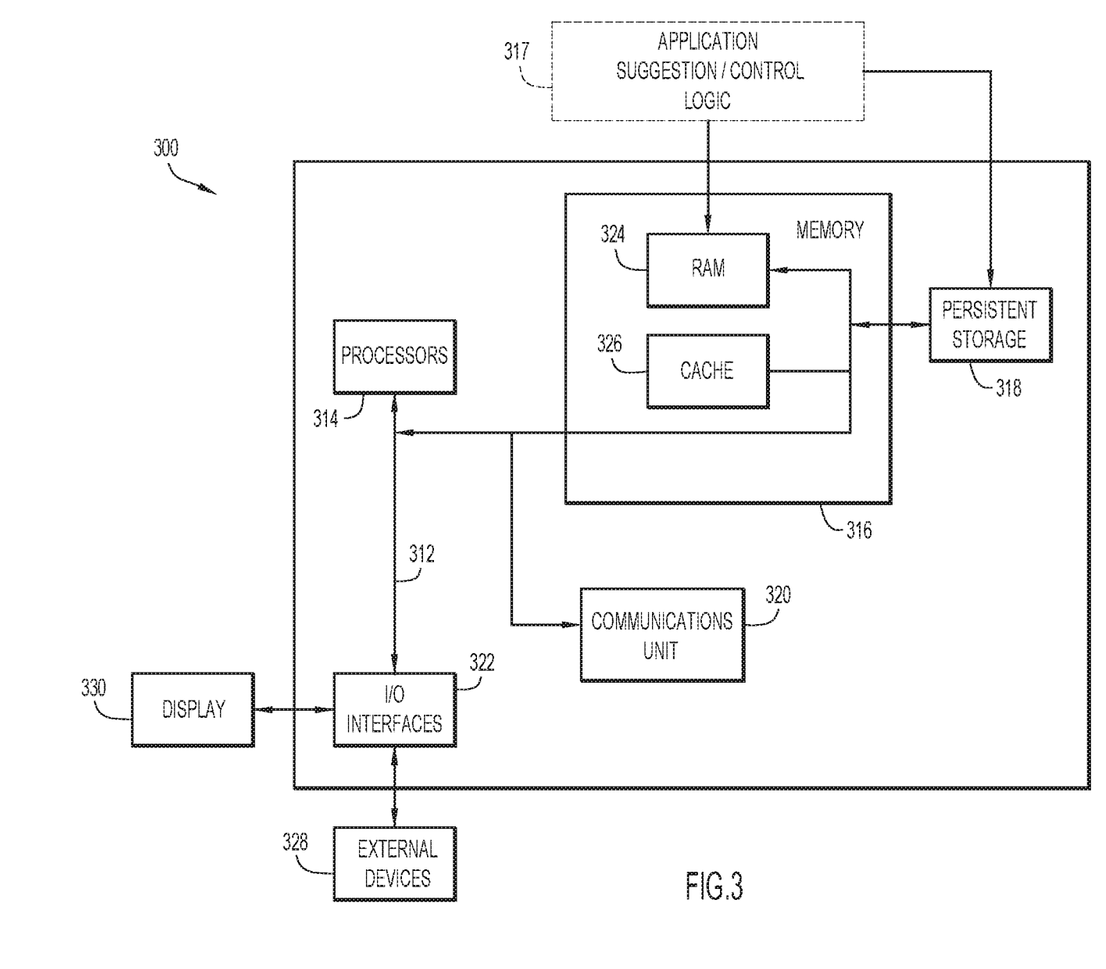
FIG. 3 is block diagram of a computing apparatus that may be configured to perform the operations described in connection with FIG. 1, according to an example embodiment.

FIG. 3 illustrates a hardware block diagram of a computing device 300 that may perform the functions of any of the servers or computing entities referred to herein in connection with FIG. 1. It should be appreciated that FIG. 3 provides only an illustration of one embodiment and does not imply any limitations with regard to the environments in which different embodiments may be implemented. Many modifications to the depicted environment may be made.

As depicted, the device 300 includes a bus 312, which provides communications between computer processor(s) 314, memory 316, persistent storage 318, communications unit 320, and input/output (I/O) interface(s) 322. Bus 312 can be implemented with any architecture designed for passing data and/or control information between processors (such as microprocessors, communications and network processors, etc.), system memory, peripheral devices, and any other hardware components within a system. For example, bus 312 can be implemented with one or more buses.

Memory 316 and persistent storage 318 are computer readable storage media. In the depicted embodiment, memory 316 includes random access memory (RAM) 324 and cache memory 326. In general, memory 316 can include any suitable volatile or non-volatile computer readable storage media. Instructions for the Application Suggestion/Control Logic 317 may be stored in memory 316 or persistent storage 318 for execution by processor(s) 314.

One or more programs may be stored in persistent storage 318 for execution by one or more of the respective computer processors 314 via one or more memories of memory 316. The persistent storage 318 may be a magnetic hard disk drive, a solid state hard drive, a semiconductor storage device, read-only memory (ROM), erasable programmable read-only memory (EPROM), flash memory, or any other computer readable storage media that is capable of storing program instructions or digital information.

The media used by persistent storage 318 may also be removable. For example, a removable hard drive may be used for persistent storage 318. Other examples include optical and magnetic disks, thumb drives, and smart cards that are inserted into a drive for transfer onto another computer readable storage medium that is also part of persistent storage 318.

Communications unit 320, in these examples, provides for communications with other data processing systems or devices. In these examples, communications unit 320 includes one or more network interface cards. Communications unit 320 may provide communications through the use of either or both physical and wireless communications links.

I/O interface(s) 322 allows for input and output of data with other devices that may be connected to computer device 300. For example, I/O interface 322 may provide a connection to external devices 328 such as a keyboard, keypad, a touch screen, and/or some other suitable input device. External devices 328 can also include portable computer readable storage media such as database systems, thumb drives, portable optical or magnetic disks, and memory cards.

Software and data used to practice embodiments can be stored on such portable computer readable storage media and can be loaded onto persistent storage 318 via I/O interface(s) 322. I/O interface(s) 322 may also connect to a display 330. Display 330 provides a mechanism to display data to a user and may be, for example, a computer monitor.

The programs described herein are identified based upon the application for which they are implemented in a specific embodiment. However, it should be appreciated that any particular program nomenclature herein is used merely for convenience, and thus the embodiments should not be limited to use solely in any specific application identified and/or implied by such nomenclature.

Data relating to operations described herein may be stored within any conventional or other data structures (e.g., files, arrays, lists, stacks, queues, records, etc.) and may be stored in any desired storage unit (e.g., database, data or other repositories, queue, etc.). The data transmitted between entities may include any desired format and arrangement, and may include any quantity of any types of fields of any size to store the data. The definition and data model for any datasets may indicate the overall structure in any desired fashion (e.g., computer-related languages, graphical representation, listing, etc.).

The present embodiments may employ any number of any type of user interface (e.g., Graphical User Interface (GUI), command-line, prompt, etc.) for obtaining or providing information (e.g., data relating to scraping network sites), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The environment of the present embodiments may include any number of computer or other processing systems (e.g., client or end-user systems, server systems, etc.) and databases or other repositories arranged in any desired fashion, where the present embodiments may be applied to any desired type of computing environment (e.g., cloud computing, client-server, network computing, mainframe, stand-alone systems, etc.). The computer or other processing systems employed by the present embodiments may be implemented by any number of any personal or other type of computer or processing system (e.g., desktop, laptop, PDA, mobile devices, etc.), and may include any commercially available operating system and any combination of commercially available and custom software (e.g., machine learning software, etc.). These systems may include any types of monitors and input devices (e.g., keyboard, mouse, voice recognition, etc.) to enter and/or view information.

It is to be understood that the software of the present embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present embodiments may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information (e.g., data relating to contact center interaction routing). The database system may be implemented by any number of any conventional or other databases, data stores or storage structures (e.g., files, databases, data structures, data or other repositories, etc.) to store information (e.g., data relating to contact center interaction routing). The database system may be included within or coupled to the server and/or client systems. The database systems and/or storage structures may be remote from or local to the computer or other processing systems, and may store any desired data (e.g., data relating to contact center interaction routing).

The present embodiments may employ any number of any type of user interface (e.g., Graphical User Interface (GUI), command-line, prompt, etc.) for obtaining or providing information (e.g., data relating to providing enhanced delivery options), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The embodiments presented may be in various forms, such as a system, a method, and/or a computer program product at any possible technical detail level of integration. The computer program product may include a computer readable storage medium (or media) having computer readable program instructions thereon for causing a processor to carry out aspects of presented herein.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects presented herein.

Aspects of the present embodiments are described herein with reference to flowchart illustrations and/or block diagrams of methods, apparatus (systems), and computer program products according to the embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 4:
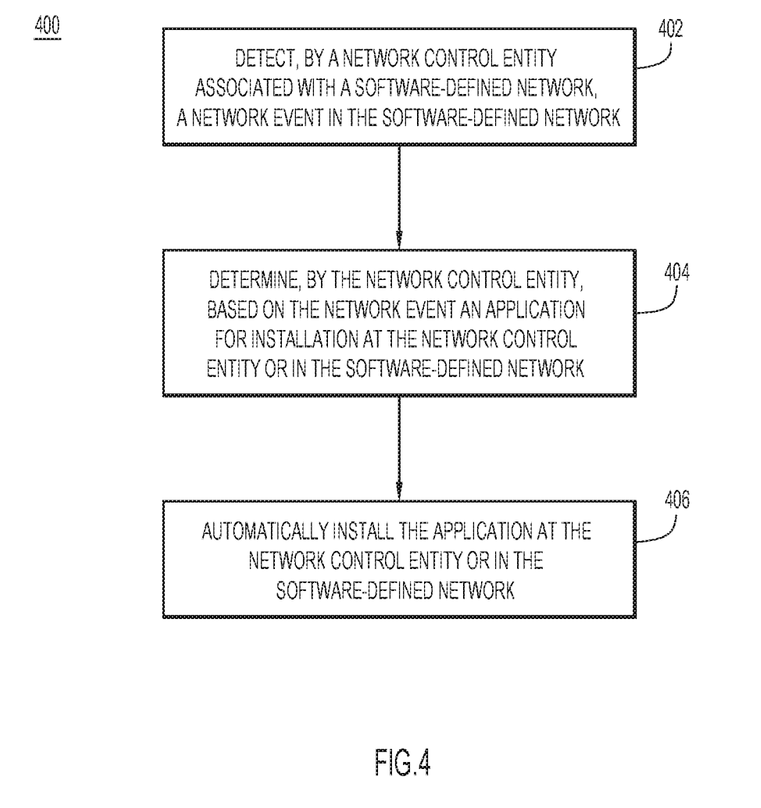
FIG. 4 is a flowchart of method for automatic application installation based on network posture, according to an example embodiment.

FIG. 4 is a flowchart illustrating a method 400, according to an example embodiment. At 402, a network control entity associated with a software-defined network detects a network event in the software-defined network. At 404, the network control entity determines, based on the network event, an application for installation at the network control entity or in the software-defined network. At 406, the application is installed at the network control entity or in the software-defined network.

The software-defined network may comprise a plurality of edge network devices, and automatically installing may comprise causing the application to be installed at one or more of the edge network devices in the software-defined network. The detecting may comprise monitoring network traffic in order to detect predetermined event condition data, and may comprise determining, based on the predetermined event condition data, that the network event has occurred in the software-defined network. The method may further include mapping each application of a plurality of applications available for installation at the network control entity or in the software-defined network to corresponding predetermined event condition data.

The detecting may comprise receiving, from at least one network device running a sensor service, an indication of the network event, and may comprise identifying the network event based on the indication.

The automatically installing may comprise determining the application is not currently installed at the network control entity or in the software-defined network.

The determining may comprise selecting the application for installation from among a plurality of applications in an application catalog. The selecting may comprise determining, based on the network event, an application relevance score for each of the plurality of applications associated with the application catalog, and may comprise selecting, based on the application relevance scores, the application from among the plurality of applications.

The method may further comprise determining, based on device constraint data, a device score for each of a plurality of network devices in the software-defined network, and wherein the automatically installing comprises installing, based on the determined device score for each of the plurality of network devices, the application at one or more of the plurality of network devices.

Figure 5:
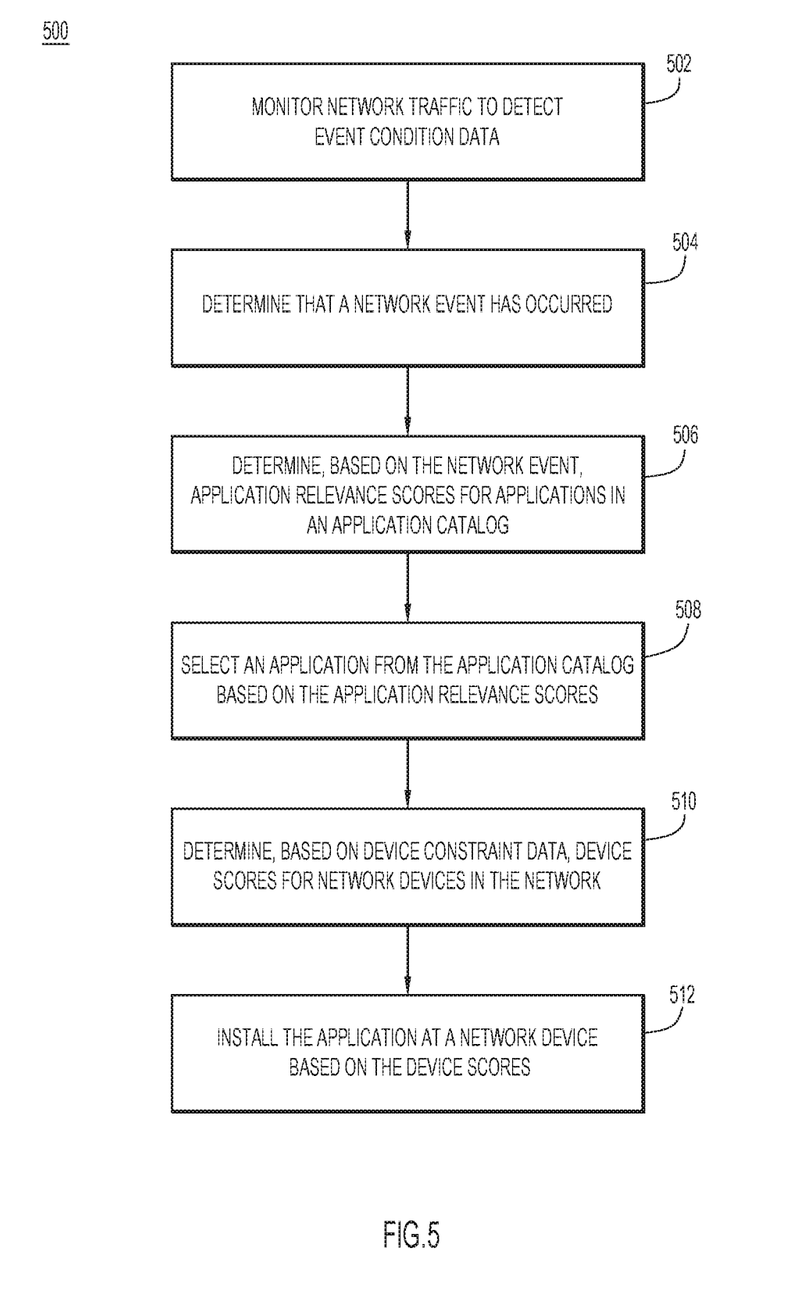
FIG. 5 is a flowchart of another method for automatic application installation based on network posture, according to an example embodiment.

FIG. 5 is a flowchart illustrating a method 500 for automatic application installation based on network posture, according to an example embodiment. Reference is also made to FIG. 1 for purposes of the description of FIG. 5. At 502, network traffic is monitored to detect event condition data. For example, the network event collector service 148 may monitor traffic in the network 120 to detect event condition data. The network event collector service 148 may receive event condition data from network devices 150 that are configured to generate data that indicates a network event. At 504, it is determined that a network event has occurred. For example, the network event collector service 148 may determine that a network event has occurred based on event condition data received from one or more of the network devices 150. For example, the network event collector service 148 may determine that a network event has occurred based on an accumulation of event condition data over time from one or more of the network devices 150. At 506, based on the network event, application relevance scores for applications in an application catalog are determined. For example, application relevance scores may be determined for applications in the application catalog 140 that are mapped to the network event that has been determined to have occurred. For example, if the network event that is determined to have occurred is that HTTPS traffic has exceeded a threshold amount (e.g., in proportion to other network traffic, with respect to HTTPS traffic in other network segments if the network is segmented, with respect to prior and/or predicted amounts of HTTPS traffic, etc.), then application relevance scores may be determined for applications in the application catalog 140 that are to be considered for use/installation when such an event occurs. This may be a subset of applications in the application catalog 140. In other words, multiple applications in the application catalog 140 may be mapped to a network event. At 508, an application from the application catalog is selected based on the application relevance scores. For example, the application with the highest relevance score may be selected. At 510, based on device constraint data, device scores for network devices in the network are determined. For example, one or more of the network devices 150 may be more relevant for the application selected at 508 as compared to the remaining of the network devices 150.

Device constraint data for the more relevant network device(s) may be used to determine devices scores for each of these network devices. For example, the application selected at 508 may indicate that it is to be run at network devices at the edge of the network 120, and device constraint data may be used to determine device scores for each of these network devices. At 512 the application is installed at a network device based on the device scores. For example, the application may be installed at the network device that has the highest device score.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
    detecting, by a network control entity associated with a software-defined network, a network event in the software-defined network;
    determining, by the network control entity, based on the network event an application for installation at the network control entity or in the software-defined network, wherein the application comprises an extension for a network management application;
    determining, based on device constraint data, a device score for each of a plurality of physical edge network devices in the software-defined network, wherein the device constraint data includes one or more of a central processor unit availability, a memory availability, a disk availability, and a runtime environment; and
    automatically installing the application at a physical edge network device of the plurality of physical edge network devices in the software-defined network, wherein the application installed at the physical edge network device comprises a honeypot application, wherein the physical edge network device is at an edge of the software-defined network, wherein the physical edge network device is selected based on the device score for the physical edge network device, wherein the application is installed by storing executable instructions for the application in a persistent storage medium of the physical edge network device, and wherein installing the application at the physical edge network device comprises selecting the application based on one or more of: a hardware resource that is connected to the physical edge network device, a pre-existing application that is installed on the physical edge network device, and a role of the physical edge network device, wherein the hardware resource comprises a compute card added to the physical edge network device or a sensor connected to the physical edge network device.

2. The method of claim 1, wherein the software-defined network comprises a plurality of edge network devices, and wherein automatically installing comprises causing the application to be installed at one or more of the plurality of edge network devices in the software-defined network.

3. The method of claim 1, wherein the detecting comprises:
    monitoring network traffic in order to detect predetermined event condition data; and
    determining, based on the predetermined event condition data, that the network event has occurred in the software-defined network.

4. The method of claim 3, further comprising mapping each application of a plurality of applications available for installation at the network control entity or in the software-defined network to corresponding predetermined event condition data.

5. The method of claim 1, wherein the detecting comprises:
    receiving, from at least one network device running a sensor service, an indication of the network event; and
    identifying the network event based on the indication.

6. The method of claim 1, wherein the automatically installing comprises determining the application is not currently installed at the network control entity or in the software-defined network.

7. The method of claim 1, wherein the determining comprises selecting the application for installation from among a plurality of applications in an application catalog.

8. The method of claim 7, wherein the selecting comprises:
    determining, based on the network event, an application relevance score for each of the plurality of applications associated with the application catalog; and
    selecting, based on the application relevance scores, the application from among the plurality of applications.

9. The method of claim 1, wherein the network event comprises a detected rate of packets for a particular protocol.

10. An apparatus comprising:
    a network interface configured to enable network communications in a software-defined network by sending packets into the software-defined network or receiving packets from the software-defined network; and
    a processor coupled to the network interface, the processor configured to:
        detect a network event in the software-defined network;
        based on the network event, determine an application for installation at the apparatus or in the software-defined network, wherein the application comprises an extension for a network management application;
        determine, based on device constraint data, a device score for each of a plurality of physical edge network devices in the software-defined network, wherein the device constraint data includes one or more of a central processor unit availability, a memory availability, a disk availability, and a runtime environment; and
        automatically install the application at a physical edge network device of the plurality of physical edge network devices in the software-defined network, wherein the application installed at the physical edge network device comprises a honeypot application, wherein the physical edge network device is at an edge of the software-defined network, wherein the physical edge network device is selected based on the device score for the physical edge network device, wherein the application is installed by storing executable instructions for the application in a persistent storage medium of the physical edge network device, and wherein installing the application at the physical edge network device comprises selecting the application based on one or more of: a hardware resource that is connected to the physical edge network device, a pre-existing application that is installed on the physical edge network device, and a role of the physical edge network device, wherein the hardware resource comprises a compute card added to the physical edge network device or a sensor connected to the physical edge network device.

11. The apparatus of claim 10, wherein the processor is configured to:
monitor network traffic in order to detect predetermined event condition data; and
determine, based on the predetermined event condition data, that the network event has occurred in the software-defined network.

12. The apparatus of claim 10, wherein the processor is configured to:
receive, from at least one network device running a sensor service, an indication of the network event; and
identify the network event based on the indication.

13. The apparatus of claim 10, wherein the processor is further configured to map each application of a plurality of applications available for installation at the apparatus or in the software-defined network to corresponding predetermined event condition data.

14. The apparatus of claim 13, wherein the processor is configured to:
determine, based on the network event, an application relevance score for each of a plurality of applications associated with an application catalog; and
select, based on the application relevance scores, the application for installation from among the plurality of applications.

15. One or more non-transitory computer readable storage media encoded with instructions that, when executed by a processor, cause the processor to:
detect, by a network control entity associated with a software-defined network, a network event in the software-defined network;
determine, by the network control entity, based on the network event an application for installation at the network control entity or in the software-defined network, wherein the application comprises an extension for a network management application;
determine, based on device constraint data, a device score for each of a plurality of physical edge network devices in the software-defined network, wherein the device constraint data includes one or more of a central processor unit availability, a memory availability, a disk availability, and a runtime environment; and
automatically install the application at a physical edge network device of the plurality of physical edge network devices in the software-defined network, wherein the application installed at the physical edge network device comprises a honeypot application, wherein the physical edge network device is at an edge of the software-defined network, wherein the physical edge network device is selected based on the device score for the physical edge network device, wherein the application is installed by storing executable instructions for the application in a persistent storage medium of the physical edge network device, and wherein installing the application at the physical edge network device comprises selecting the application based on one or more of: a hardware resource that is connected to the physical edge network device, a pre-existing application that is installed on the physical edge network device, and a role of the physical edge network device, wherein the hardware resource comprises a compute card added to the physical edge network device or a sensor connected to the physical edge network device.

16. The non-transitory computer readable storage media of claim 15, wherein the software-defined network comprises a plurality of edge network devices, and wherein the instructions to automatically install comprises instructions to cause the application to be installed at one or more of the edge network devices in the software-defined network.

17. The non-transitory computer readable storage media of claim 15, wherein the instructions to identify further cause the processor to:
monitor network traffic in order to detect predetermined event condition data; and
determine based on the predetermined event condition data, that the network event has occurred in the software-defined network.

18. The non-transitory computer readable storage media of claim 17, wherein the instructions further cause the processor to map each application of a plurality of applications available for installation at the network control entity or in the software-defined network to corresponding predetermined event condition data.

19. The non-transitory computer readable storage media of claim 15, wherein the instructions to detect further cause the processor to:
receive, from at least one network device running a sensor service, an indication of the network event; and
identify the network event based on the indication.

20. The non-transitory computer readable storage media of claim 15, wherein the instructions to determine further cause the processor to:
determine, based on the network event, an application relevance score for each of a plurality of applications associated with an application catalog; and
select, based on the application relevance scores, the application for installation from among the plurality of applications.

* * * * *